(12) United States Patent
Yeh (10) Patent No.: US 11,370,515 B2
(45) Date of Patent: Jun. 28, 2022

(54) PADDLE

(71) Applicant: Tzong In Yeh, Dana Point, CA (US)

(72) Inventor: Tzong In Yeh, Dana Point, CA (US)

( * ) Notice: Subject to any disclaimer, the term of this patent is extended or adjusted under 35 U.S.C. 154(b) by 0 days.

(21) Appl. No.: 16/986,648

(22) Filed: Aug. 6, 2020

(65) Prior Publication Data

US 2021/0323647 A1  Oct. 21, 2021

(30) Foreign Application Priority Data

Apr. 16, 2020 (TW) ................................ 109112886

(51) Int. Cl.
*B63H 16/04* (2006.01)
*F16B 7/14* (2006.01)

(52) U.S. Cl.
CPC ........... *B63H 16/04* (2013.01); *F16B 7/1454* (2013.01)

(58) Field of Classification Search
CPC .............................. B63H 16/04; F16B 7/1454
See application file for complete search history.

(56) References Cited

U.S. PATENT DOCUMENTS

| | | | | |
|---|---|---|---|---|
| 6,022,255 A * | 2/2000 | Lukanovich | ........... | B63H 16/04 440/101 |
| 8,162,709 B2 * | 4/2012 | Boyer | ................... | B63H 16/04 440/102 |
| 8,167,669 B1 * | 5/2012 | Xie | ........................ | B63H 16/04 440/102 |
| 9,327,814 B2 * | 5/2016 | Packer | ................... | B63H 16/04 |
| 2012/0028519 A1 * | 2/2012 | Rechner | ................ | B63H 16/04 440/102 |
| 2013/0101418 A1 * | 4/2013 | McClain | ................ | B63H 16/04 416/71 |
| 2014/0248075 A1 * | 9/2014 | Lee | .......................... | F16B 7/10 403/109.1 |
| 2017/0055508 A1 * | 3/2017 | Shiflett, Jr. | ............ | B63H 16/04 |

FOREIGN PATENT DOCUMENTS

| CN | 205186496 U | 4/2016 |
|---|---|---|
| CN | 205256642 U | 5/2016 |
| CN | 205891199 U | 1/2017 |
| CN | 206125387 U | 4/2017 |
| CN | 209757491 U | 12/2019 |

* cited by examiner

*Primary Examiner* — S. Joseph Morano
*Assistant Examiner* — Jovon E Hayes
(74) *Attorney, Agent, or Firm* — Muncy, Geissler, Olds & Lowe, P.C.

(57) ABSTRACT

The present invention disclosed a paddle, which includes a blade and a pole that connects to the blade. The pole consists of a first rod and a second rod capable of entering and moving within; with one end of the second rod connected to the first rod and able to move simultaneously. Wherein, the material of the first rod within the pole is different from that of the pole, and the paddle is less likely to break instantaneously.

15 Claims, 7 Drawing Sheets

PADDLE

BACKGROUND OF THE INVENTION

1. Field of the Invention

The present invention relates to a paddle, and more particularly to the paddles that have extendable structure.

2. Description of the Related Art

While water sports are prevalent currently, paddles that are associated with paddleboards, canoes, rubber rafts, or other manpower boats are already quite common. As of now, many types of pre-existing paddles are adjustable in lengths, such as CN205186496U, CN205256642U, CN205891199U and other patents. This type of adjustable length paddles mostly comprises a blade for gliding through the waters; a pole that connects to the blade; an extendable rod within the pole for adjusting the length of the pole; a clamp that is fixed on the pole for clamping the extendable rod; and a handle that connects to the extendable rod. Wherein, the pole and the extendable rod together make a paddle rod that is adjustable in length allowing the user to hold and apply force.

Conventional paddle rods include a pole and an extendable rod, both made of lightweight metals such as aluminium or aluminium alloys. Also, the clamp, as mentioned above, is used in other types of paddles, such as CN206125387U, CN209757491U, US20140248075A and U.S. Ser. No. 08/162,709.

SUMMARY OF THE INVENTION

The present invention provides a paddle, in which the paddle includes a blade and a pole forming a paddle rod. The paddle rod includes a pole having one end connected to the blade, a first rod that is inserted into the other end of the pole and capable of moving freely within, a second rod that is connected to one end of the first rod and is inserted into said pole so that said second rod and said first rod are capable of moving together within said pole. In this case, the first rod and the pole are made of different materials.

In one aspect, the first rod of the present invention has higher toughness than the pole.

In another aspect, the first rod of the present invention is less likely to break instantaneously than the pole.

In still another aspect, the first rod of the present invention is made of either polypropylene or glass-fibre reinforced polypropylene.

In yet another aspect of the present invention, the pole is made of metal, and the first rod is made of plastic. Preferably, the plastic is either polypropylene or glass-fibre reinforced polypropylene. Preferably, the metal is either aluminium or aluminium alloys.

In still another aspect, the second rod of the present invention is made of metal. Preferably, the metal is either aluminium or aluminium alloys.

In yet another aspect of the present invention, the paddle includes a clamp that is fixed on the other end of the pole to clamp or release the second rod when it is pulled out of the pole.

In still another aspect of the present invention, the paddle includes an accessory set and a pin-hole located near the other end of the second rod. In this case, the accessory set includes a joint, a connection pipe, a c-shaped clip and a functional element. Furthermore, the joint has an axial-direction passage, an upper-hole and two side openings that radially passes through the joint respectively; wherein the axial-direction passage has a front opening and a rear opening, said front opening is capable of receiving the other end of said second rod, the upper-hole and the two side openings are both located near the front opening, the two side openings are opposite to each other and respectively situated underneath the left and right side of the upper-hole. The connection pipe includes a front portion capable of receiving the other end of the second rod to enter and a rear portion; the front portion is inserted into the rear opening of the joint and fixed in the axial-direction passage, the front portion also has a lower-hole that radially passes through and two arc surfaces respectively situated underneath the left and right side of the lower-hole, the lower-hole aligns to the upper-hole of the joint, the two arc surfaces each respectively exposed from the two side openings of the joint. The c-shaped clip is disposed on the joint and has a pin opposite to the upper-hole of the joint and two end portions that respectively reaches into the two side openings of the joint and leans against the two arc surfaces, wherein the c-shaped clip is capable of moving radially relative to the joint so that the pin that locates on the c-shaped clip can move radially together and be inserted or pulled out of the upper-hole of the joint and the lower-hole of the connection pipe, wherein when the other end of the second rod is inserted into the joint then enters into the front portion of the connection pipe, the pin that is inserted into the upper-hole of the joint and the lower-hole of the connection pipe can also reach into the pin-hole of the second rod. The functional element is connected to the rear portion of the connection pipe. Preferably, the functional element is either another blade or a handle.

In yet another aspect of the present invention, the c-shaped clip has two bolts on each side of the two end portions; the joint has two restriction walls situated near each opening of the two side openings, the two restriction walls restrict the movements of the two bolts of the c-shaped clip. Preferably, each of the two restriction walls has a gap that allows the two bolts to pass correspondingly.

In still another aspect of the present invention, the paddle includes a first restriction part fixed within the connection pipe of the accessory set and a second restriction part fixed within the second rod, the first restriction part has a groove and the second restriction part has an insert sheet, when the second rod is inserted axially through the front opening of the joint and entered the front portion of the connection pipe, the insert sheet of the second restriction part is then embedded into the groove of the first restriction part. Preferably, the second restriction part has a receiving-hole, the receiving-hole is aligned to the pin-hole of the second rod, and the pin of the c-shaped clip also reaches further into the receiving-hole of the second restriction part.

Compared with related arts, the paddle provided by the present invention mainly sets on the first rod and the pole to prevent or reduce the chances of the paddle suffering from an instantaneous break.

Other objectives, advantages and features of the present invention will be apparent from the following description referring to the attached drawings.

BRIEF DESCRIPTION OF THE DRAWINGS

The present invention will become more fully understood from the detailed description and the accompanying drawings, wherein.

DETAILED DESCRIPTION OF EMBODIMENTS

Figure 1:
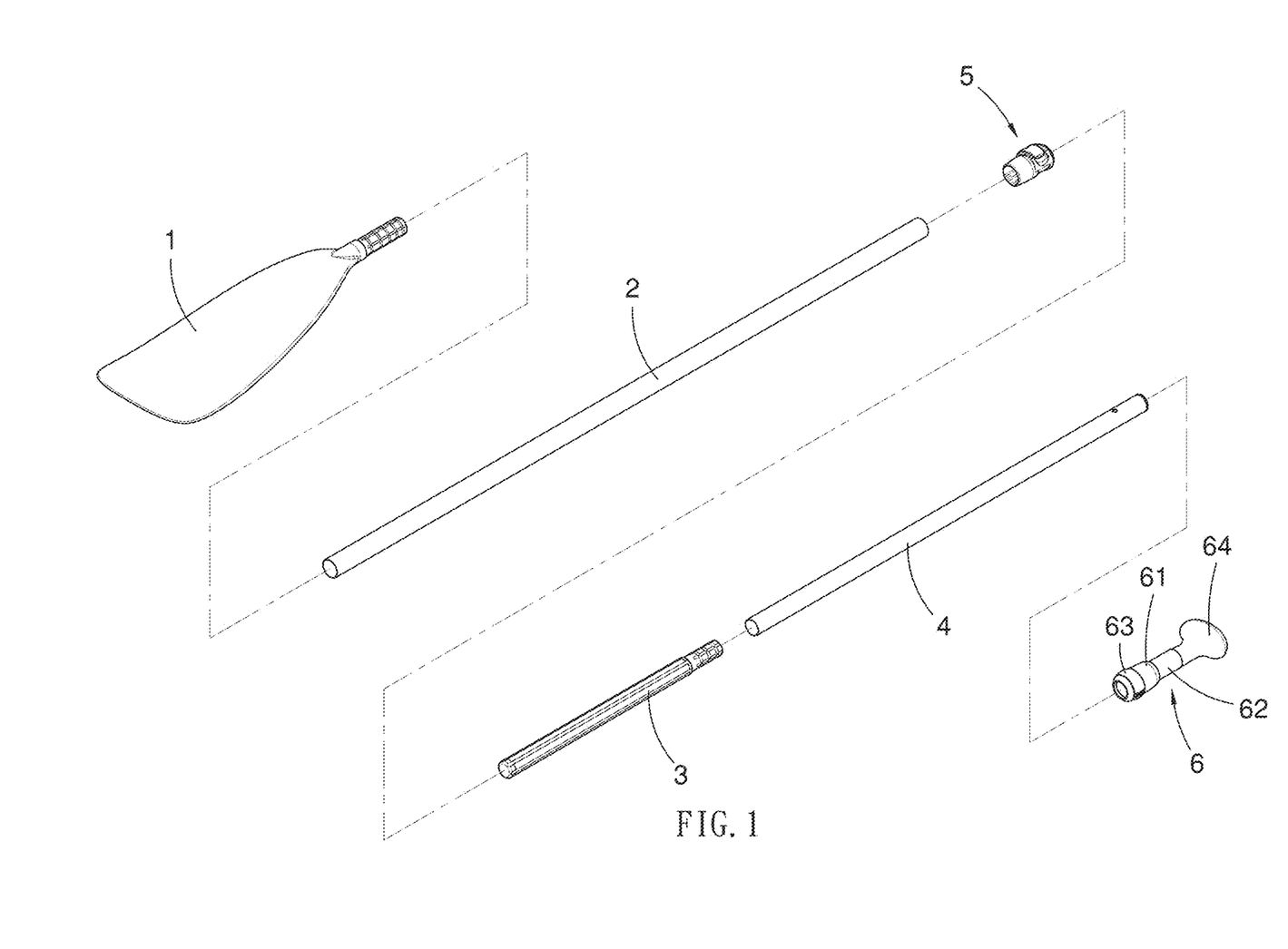
FIG. 1 is an exploded perspective view of a preferred embodiment of the paddle of the present invention.
Figure 2:
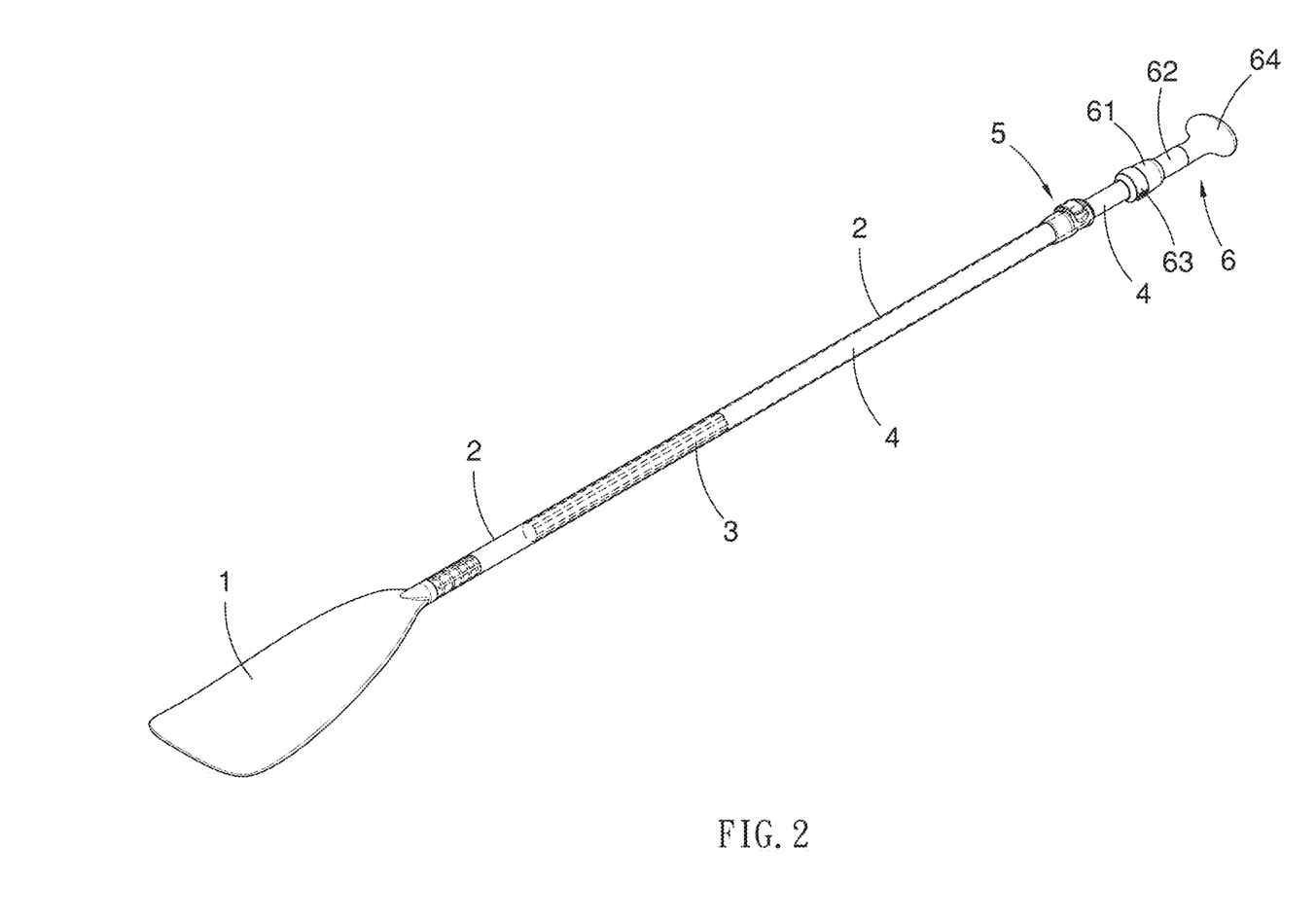
FIG. 2 is a perspective view of the preferred embodiment of the present invention.

Referring to FIGS. 1 and 2, there is shown a preferred embodiment of the present invention. The figures show a kind of paddle including a blade 1 for gliding through the waters, a pole 2 having one end connected to the blade 1, a first rod 3 inserted into the other end of the pole 2 and capable of moving within the pole 2 freely, and a second rod 4 having one end connected to the first rod 3 and capable of moving together with the first rod 3. The blade 1 is often made of plastic with more rigidity for gliding the waters efficiently, the plastic, in this case, is preferably nylon or glass-fibre reinforced nylon but not limited to the foregoing materials.

The pole 2, the first rod 3, and the second rod 4 together form into an adjustable-length paddle rod. When the length of the paddle needs to be adjusted, the desired length can be adjusted by pulling or pushing the second rod 4. The pole 2 and the second rod 4 are for a user to hold and apply force, they are often made of metal with good rigidity to allow the users to apply force better and transfer the force to the blade 1. Materials that are light and with good rigidity such as aluminium tubes or aluminium alloys tube (preferably the 6601 series aluminium alloys) are preferred but not limited to these foregoing materials.

Figure 3:
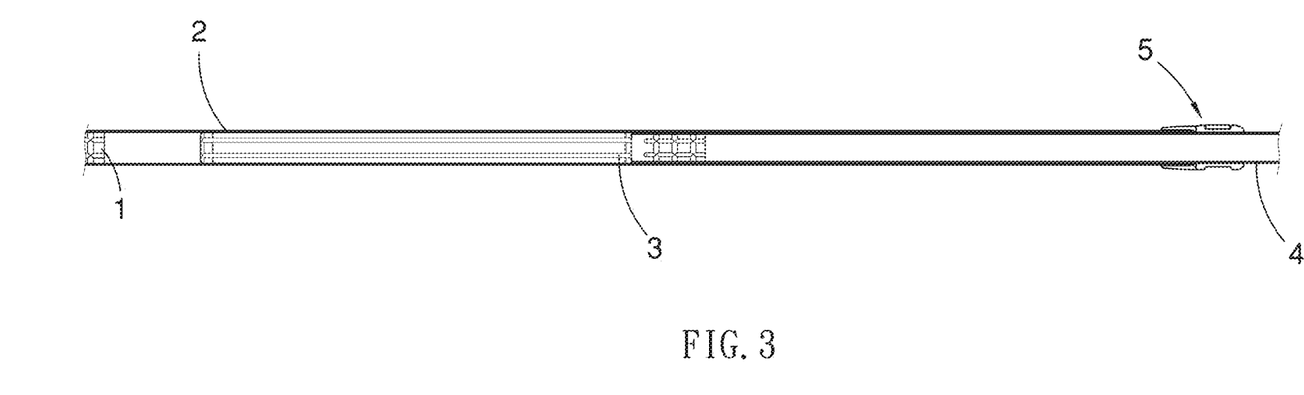
FIG. 3 is a partial cross-sectional view of FIG. 2.

As shown in FIG. 3, the first rod 3 is located within the pole 2 in order to avoid or reduce the possibility of an instantaneous and complete break of the paddle. More specifically, an "instantaneous and complete break" refers to a paddle rod that is broken into two separate pieces. If the paddle rod is instantaneously and completely broken from a certain point on pole 2 when being used by the user, the user might be subjected to harm from the fracture of the broken paddle rod. For example, the user's thighs or abdomen might be impaled or lacerated by the broken paddle rod. The first rod 3 of the present invention is made of a material different from the pole 2 and is disposed within the pole 2. The first rod 3 is capable of moving together with the second rod 4, which can not only avoid or reduce the possibility of an instantaneous and complete break of the paddle, but also maintain the length adjustable function of the paddle.

The first rod 3 can be made of plastic, preferably plastics with higher toughness such as polypropylene or glass-fibre reinforced polypropylene, and preferably blended with polypropylene blended with 30% glass-fibre for the desired toughness and rigidity. However, the material of the first rod 3 is not limited to the foregoing materials. For example, it can be made of metal, plastic or other materials with higher toughness than the pole 2. In other words, the first rod 3 can be made of the material less likely to be instantaneously and completely broken than the material of the pole 2.

The first rod 3 and the second rod 4 are preferably made of different materials. For example, the first rod 3 is made of plastic, and the second rod 4 is made of metal. However, the first rod 3 and the second rod 4 can also be made of the same material. For example, one of the plastics mentioned above or other plastics can be selected to make the first rod 3 and the second rod 4, if so, the first rod 3 and the second rod 4 can be merged into one. The pole 2 and the second rod 4 are preferably made of the same material, such as one of the metals mentioned above but not limited to those. Also, the first rod 3 and the second rod 4 are preferably hollow, but may also be solid.

Figure 4:
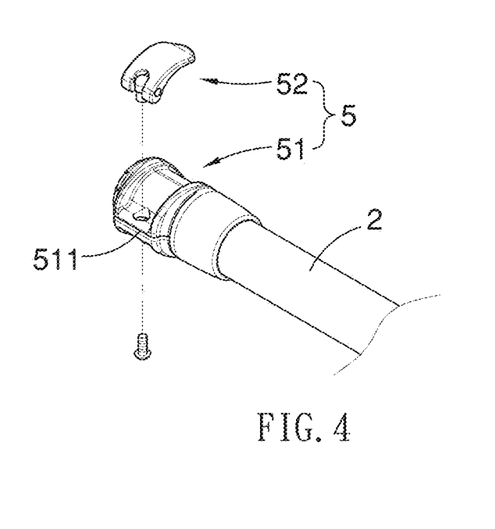
FIG. 4 is an exploded perspective view of a clamp 5 of the preferred embodiment of the present invention.
Figure 5:
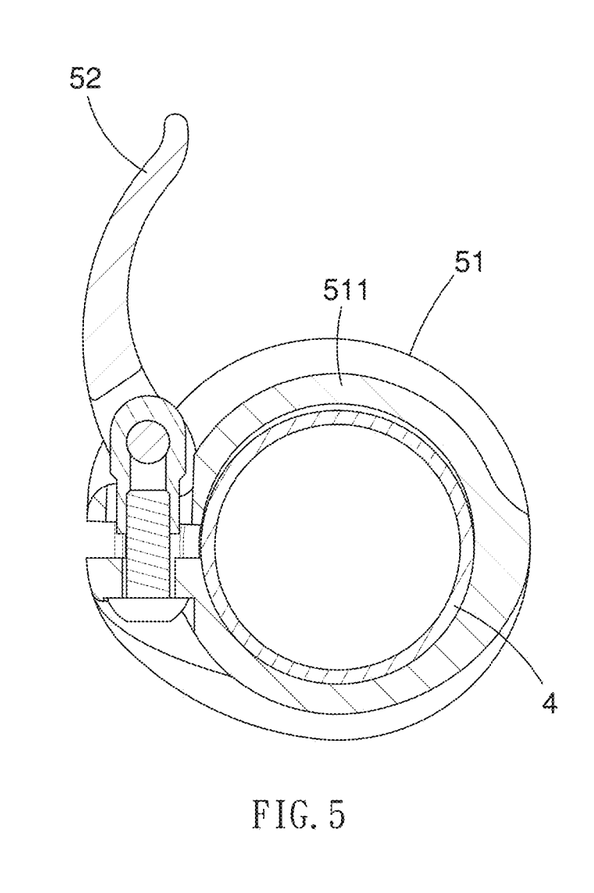
FIG. 5 and FIG. 6 are the (enlarged) cross-sectional views of the clamp 5 under different states when used.
Figure 6:
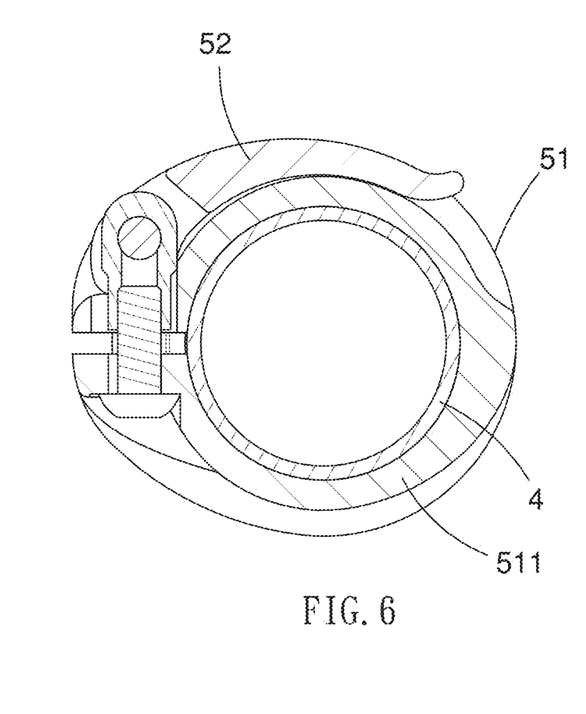

As shown in FIGS. 1 and 2, the paddle preferably further includes a clamp 5, the clamp 5 is fixed to the other end of the pole 2 and is used to clamp or release the portion of the second rod 4 when it is pulled out of the pole 2. In this embodiment, as shown in FIG. 4, the clamp 5 is a quick release clamp, which includes a base 51 and a tightening handle 52. FIG. 5 shows that the tightening handle 52 is in a released position, so that a c-shaped holder 511 of the base 51 does not clamp around the second rod 4, in this state, the second rod 4 can be pulled out or pushed in to adjust the length of the portion extending out of the pole 2. FIG. 6 shows that the tightening handle 52 is in a locked position, so that the c-shaped holder 511 of the base 51 tightly clamp around the second rod 4, which makes the second rod 4 not shift easily. In addition, the clamp 5 can also be replaced by any other locking mechanisms having the same or similar functions, such as the Taiwanese Patent No. 1490419, or other locking mechanisms used by other conventional adjustable rod.

Figure 7:
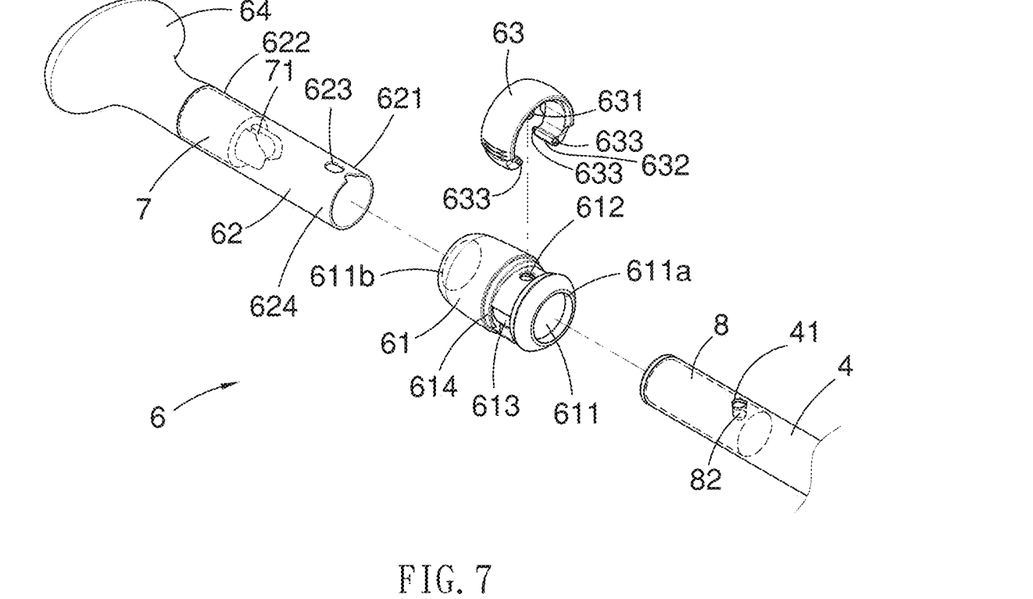
FIG. 7 and FIG. 8 are the exploded perspective views of an accessory set 6 of the preferred embodiment of the present invention from different angles.
Figure 8:
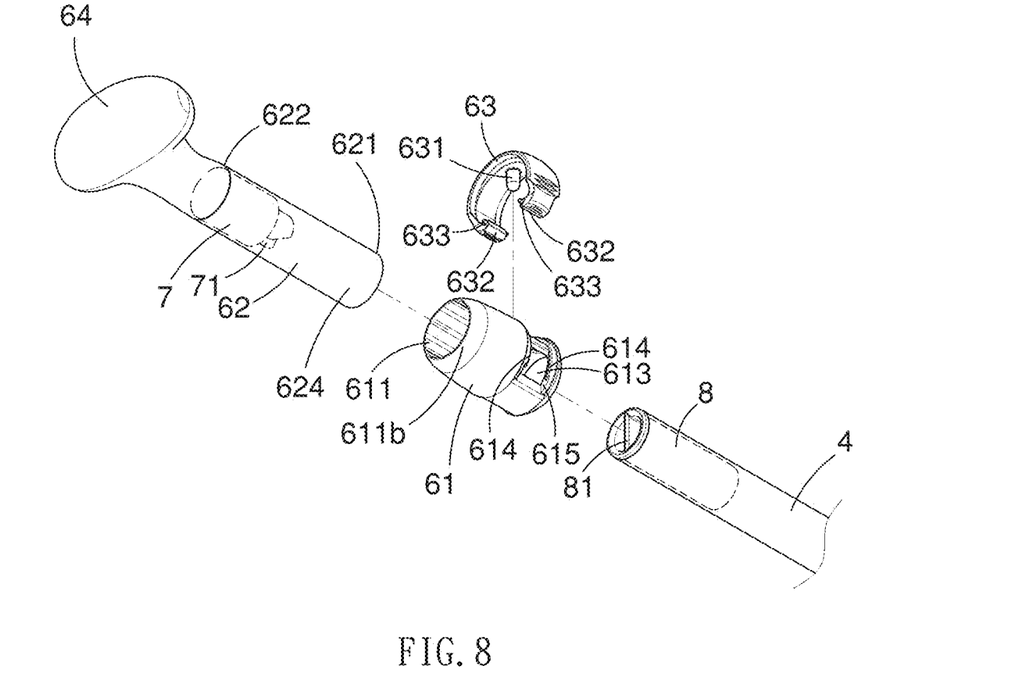
Figure 9:
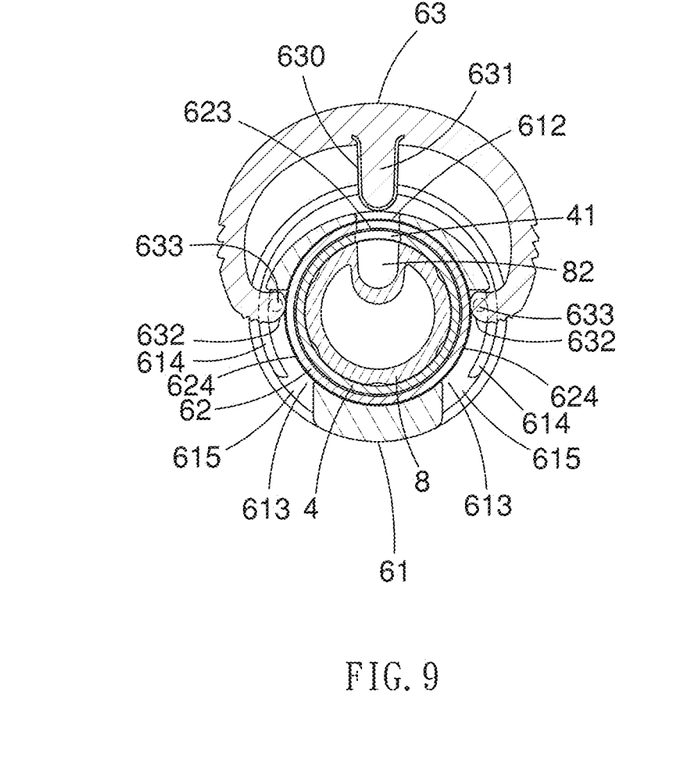
FIG. 9 and FIG. 10 are the (enlarged) cross-sectional views of the accessory set 6 under different states when used.

Moreover, as shown in FIGS. 1 and 2, the paddle preferably further includes an accessory set 6. In one embodiment, as shown in FIGS. 7 and 8, the accessory set 6 includes a joint 61 for receiving the other end of the second rod 4, a connection pipe 62 connected to the joint 61 at one end, a c-shaped clip 63 fixed on the joint 61 and a functional element 64 connected to the other end of the connection pipe 62. Wherein:

The joint 61 is preferably made of plastic with good rigidity, such as nylon or glass-fibre reinforced nylon. In addition, the joint 61 has an axial-direction passage 611, an upper-hole 612 and two side openings 613 that radially passes through the joint respectively. The axial-direction passage 611 has a front opening 611a and a rear opening 611b, the upper-hole 612 and the two side openings 613 are both near the front opening 611a. As shown in FIG. 9, the two side openings 613 are opposite to each other and respectively situated underneath the left and right side of the upper-hole 612.

The connection pipe 62 has a front portion 621 and a rear portion 622. The front portion 621 is a short round tube inserted through the rear opening 611b of the joint 61 of the axial-direction passage 611 and fixed in the axial-direction passage 611. In this embodiment, not only the front portion 621, but also the entire connection pipe 62 is a round pipe with a predetermined length, and the material of the connection pipe 62 can be made of the aforementioned metals, but not limited to those, wherein the front portion 621 also has a lower-hole 623 radially passing through and two arc surfaces 624 respectively situated underneath the left and right side of the lower-hole 623. As shown in FIG. 9, the lower-hole 623 is aligned with the upper-hole 612 of the joint 61, the two arc surfaces 624 are respectively exposed from the two side openings 613 of the joint 61.

Figure 10:
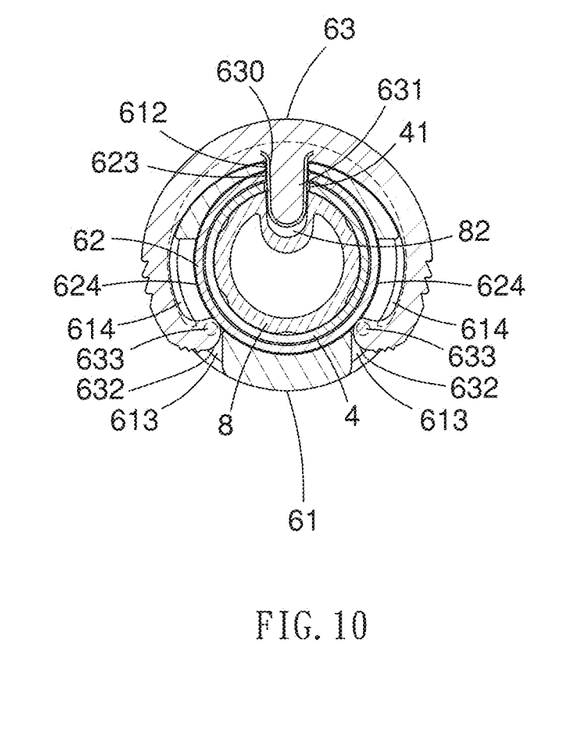
Figure 11:
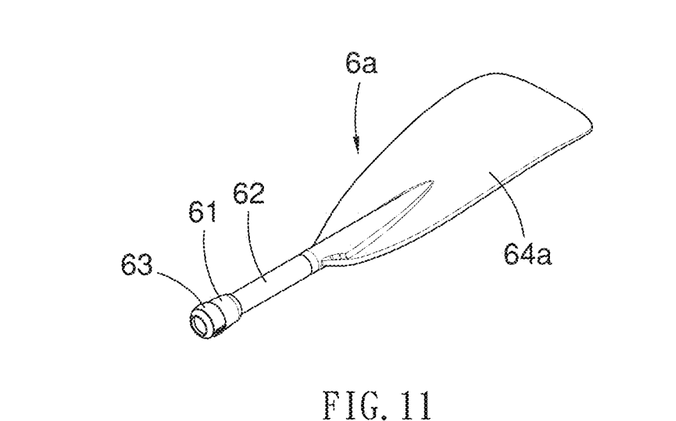
FIG. 11 is a perspective view of another accessory set 6a of the present invention.

The c-shaped clip 63 is preferably made of the plastic with good elasticity, such as polyethylene terephthalate, or glass-fibre reinforced polyethylene terephthalate. The c-shaped clip 63 is disposed on the joint 61 and has a pin 631 and two end portions 632. As shown in FIG. 9, the pin 631 is opposite to the upper-hole 612 of the joint 61 and the two end portions 632 respectively reach into the two side openings 613 of the joint 61 and respectively leaning against the two arc surfaces 624 of the connection pipe 62. In this embodiment, the pin 631 is covered with a pin shell 630. The pin shell 630 is preferably made of a wear-resistant material, such as the aforementioned metals or other suitable metals. Furthermore, as shown in FIGS. 9 and 10, the c-shaped clip 63 capable of moving in the radial direction relative to the joint 61 so that the pin 631 can move radially with the movement of the c-shaped clip 63 to be inserted into or pulled out of the upper-hole 612 of the joint 61 and the lower-hole 623 of the connection pipe 62. The functional element 64 is connected to the rear portion 622 of the connection pipe 62, and as shown in the figure, it is a handle (or paddle grip), but not limited to this. For example, FIG. 11 shows another accessory set 6a, its functional element 64a is a blade, and the remaining components are the same as the accessory set 6 described above, and will not be discussed further in detail.

Since the c-shaped clip 63 is elastic, and its two end portions 632 are clipped onto the two arc surfaces 624 of connection pipe 62, therefore, as shown in FIGS. 9 and 10, when the c-shaped clip 63 is moving radially, it will have an elastic deformation in response to the change of radian of the two arc surfaces 624. Also, the two end portions 632 moves along the two arc surfaces 624 and always lean against the two arc surfaces 624. In this way, when the c-shaped clip 63 is radially pulled from a locked position, as shown in FIG. 10, to a released position, as shown in FIG. 9, the c-shaped clip 63 will be stuck temporarily and not return to the locked position arbitrarily, which keeps the pin 631 out of the upper-hole 612 and the lower-hole 623. At this point, the other end of the second rod 4 can be inserted into the joint 61 and the connection pipe 62, and the pin-hole 41 on the second rod 4 will face the lower-hole 623 of the connection pipe 62. As long as the c-shaped clip 63 is pushed, the c-shaped clip 63 will return to its the locked position. At this point, the pin 631 is inserted into not only the upper-hole 612 of the joint 61 and the lower-hole 623 of the connection pipe 62, but also the pin-hole 41 of the second rod 4 so that the entire accessory set 6 cannot be separated from the second rod 4 unless the c-shaped clip 63 is pulled to the released position.

In this embodiment, as shown in FIGS. 7 and 8, each of the two sides of each end portion 632 of the c-shaped clip 63 has bolt 633, and each side opening 613 of the joint 61 has two opposite edges, the joint 61 has two restriction walls 614 respectively situated near the edges. As shown in FIG. 9, the two restriction walls 614 restrict respectively the movements of the bolts 633 of the c-shaped clip 63 so that the c-shaped clip 63 will not detach arbitrarily from the joint 61. Preferably, each restriction wall 614 also has a gap 615 allowing the corresponding bolts 633 to pass in order to facilitate the c-shaped clip 63 to be detached or reconnected to the joint 61. In any case, by means of the c-shaped clip 63, the accessory set 6 or 6a or even other accessory sets can be assembled with the second rod 4.

Figure 12:
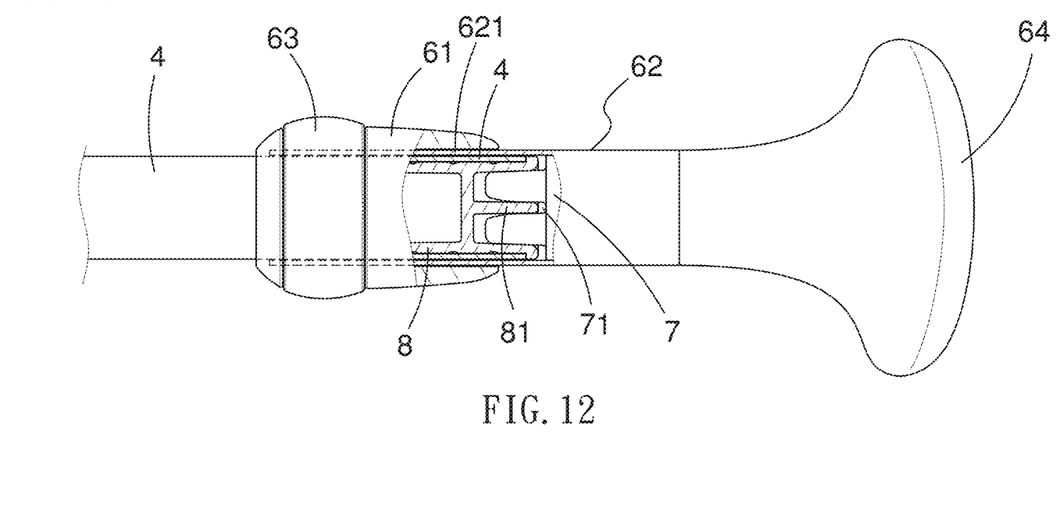
FIG. 12 is an (enlarged) partial cross-sectional view of the other accessory set 6 of the present invention.

Preferably, as shown in FIGS. 7 and 8, the paddle further includes a first restriction part 7 fixed in the connection pipe 62 of the accessory set 6 and a second restriction part 8 fixed in the second rod 4. The first restriction part 7 has a groove 71, the second restriction part 8 has an insert sheet 81, and as shown in FIG. 12, when the second rod 4 is inserted axially into the front opening 611a of the joint 61 and enters into the front portion 621 of the connection pipe 62, the insert sheet 81 of the second restriction part 8 is embedded into the groove 71 of the first restriction part 7. The entire accessory set 6 will then be secured and not rotate along with the second rod 4.

In addition, the second restriction part 8 also has a receiving-hole 82 facing the pin-hole 41 of the second rod 4. As shown in FIG. 10, when the c-shaped clip 63 is in the locked position, the pin 631 further reaches into the receiving-hole 82 of the second restriction part 8.

What is claimed is:

1. A paddle, comprising:
   a blade for gliding through the waters;
   a pole having one end connected to said blade;
   a first rod inserted into the other end of said pole and capable of moving within the pole, wherein, said first rod and said pole are made of different materials; and
   a second rod having one end connected to said first rod and partly inserted into said pole so that said second rod and said first rod are capable of moving together within said pole.

2. The paddle of claim 1, wherein said first rod is inside said pole, and said second rod has a first section inserted said pole and a second section outside said pole.

3. The paddle of claim 1, wherein said first rod has higher rigidity than said pole so that said first rod is less likely to be broken instantaneously than said pole.

4. The paddle of claim 1, wherein said first rod is made of either polypropylene or glass-fibre reinforced polypropylene.

5. The paddle of claim 1, wherein said pole is made of metal and said first rod is made of plastic.

6. The paddle of claim 5, wherein said plastic is either polypropylene or glass-fibre reinforced polypropylene.

7. The paddle of claim 6, wherein said second rod is made of metal.

8. The paddle of claim 7, said metal is either aluminium or aluminium alloy.

9. The paddle of claim 1, comprising
   a clamp fixed on the other end of said pole to clamp or release said second rod when it is pulled out of the pole.

10. The paddle of claim 1, further comprising an accessory set and, said second rod having a pin-hole near the other end thereof, and said accessory set including:
    a joint having an axial-direction passage axially passing through, an upper-hole radially communicating to said axial-direction passage, and two side openings radially communicating to said axial-direction passage respectively, wherein said axial-direction passage has a front opening and a rear opening, said front opening is capable of receiving the other end of said second rod, said upper-hole and said two side openings are both near said front opening, said two side openings are opposite to each other and respectively situated underneath the left and right side of said upper-hole;
    a connection pipe having a front portion capable of receiving the other end of said second rod and a rear portion, said front portion inserted into said rear opening of said joint and fixed in said axial-direction passage, said front portion having a lower-hole radially passing through and two arc surfaces respectively situated underneath the left and right side of said lower-hole, said lower-hole aligning to said upper-hole of said joint, said two arc surfaces respectively exposed from said two side openings of said joint;

a c-shaped clip disposed on said joint and having a pin aligned to said upper-hole of said joint and two end portions respectively reaching into said two side openings of said joint and respectively leaning against said two arc surfaces, wherein said c-shaped clip is capable of moving in the radial direction relative to said joint so that said pin can move radially with the movement of said c-shaped clip to insert into or pull out of said upper-hole of said joint and said lower-hole of said connection pipe, wherein when the other end of said second rod is inserted into said joint then entering into said front pipe of said connection pipe, said pin inserted into said upper-hole of said joint and said lower-hole of said connection pipe can also be inserted into said pin-hole of said second rod; and a functional element connected to said rear portion of said connection pipe.

11. The paddle of claim 10, wherein said functional element is either another blade or a handle.

12. The paddle of claim 10, wherein each of the two sides of each end portion of said c-shaped clip has a bolt, each side opening of said joint has two opposite edges, said joint has two restriction walls respectively situated near said edges, and said restriction walls restrict respectively the movements of said bolts.

13. The paddle of claim 12, wherein each restriction wall has a gap to allow each corresponding bolt to pass.

14. The paddle of claim 10, including a first restriction part fixed within said connection pipe of said accessory set and a second restriction part fixed within said second rod, wherein said first restriction part has a groove and said second restriction part has an insert sheet, when said second rod is inserted axially into said front opening of said joint and entered into said front pipe of said connection pipe, said insert sheet of said second restriction part is embedded into said groove of said first restriction part.

15. The paddle of claim 14, wherein said second restriction part has a receiving-hole, said receiving-hole is facing said pin-hole of said second rod, and said pin of said c-shaped clip further reaching into said receiving-hole of said second restriction part.

* * * * *